(12) United States Patent
Morgan

(10) Patent No.: US 8,430,630 B2
(45) Date of Patent: Apr. 30, 2013

(54) ROTARY COUPLING

(75) Inventor: Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 433 days.

(21) Appl. No.: 12/829,772

(22) Filed: Jul. 2, 2010

(65) Prior Publication Data

US 2011/0014051 A1     Jan. 20, 2011

(30) Foreign Application Priority Data

Jul. 17, 2009 (GB) .................................. 0912379.5

(51) Int. Cl.
*F04D 29/10* (2006.01)
(52) U.S. Cl.
USPC ........................ 415/231; 415/171.1
(58) Field of Classification Search .................... 415/30, 415/33, 36, 171.1, 229, 230, 231
See application file for complete search history.

(56) References Cited

U.S. PATENT DOCUMENTS

| 3,663,119 A | 5/1972 | Brooking et al. |
| 4,013,297 A | 3/1977 | Smith |
| 2008/0053305 A1 | 3/2008 | Struschka |

FOREIGN PATENT DOCUMENTS

| DE | 24 37 138 A1 | 2/1976 |
| FR | 1.166.140 A | 11/1958 |
| GB | 2 187 526 A | 9/1987 |
| WO | WO 85/04223 A1 | 9/1985 |

OTHER PUBLICATIONS

DE2437138 description translation provided from Espacenet.*
United Kingdom Search Report dated Oct. 30, 2009 in United Kingdom Patent Application No. 0912379.5.
European Search Report issued in European Patent Application No. EP 10 16 8233 dated Oct. 27, 2010.

* cited by examiner

*Primary Examiner* — Nathaniel Wiehe
*Assistant Examiner* — Justin Seabe
(74) *Attorney, Agent, or Firm* — Oliff & Berridge, PLC

(57) ABSTRACT

A rotary coupling having a first element and a coaxial second element, the first and second elements being rotatable relative to each other and defining an annular passage between radially facing walls thereof. The coupling has a sealing ring at an end of the annular passage, the sealing ring being mounted to the wall of the first element and rotating relative to the second element, and having an active configuration in which the sealing ring is urged against the wall of the second element to seal the end of the annular passage, and a return configuration in which the sealing ring does not seal the end of the annular passage. A control system is used to apply a variable load to the sealing ring, wherein the sealing ring moves between the active and return configurations in response to variation in the applied load.

15 Claims, 5 Drawing Sheets

ROTARY COUPLING

The present invention relates to a rotary coupling.

In a rotary coupling having two coaxial elements, with one element rotating relative to the other element, rotary seals can be used for sealing the ends of an annular passage formed by radially facing walls of the two elements in order to maintain pressure differentials across the ends of the passage and to block the axial flow of fluid into or out of the passage.

Rotary couplings of this type can be used to transmit, e.g. hydraulic fluid radially between the elements.

Such seals can be diverse in their detailed design, but generally comprise a sealing ring mounted to one of the is elements. To appropriately bias the sealing ring, even when there is no pressure differential across the respective end of the passage, the ring may be positioned by a separate spring or elastomeric bias device. Alternatively, the same effect may be achieved by pre-compression of the ring or by an internal spring element.

These biasing systems urge the sealing ring against the other element to partially block the leakage gap at the end of the passage and to allow a differential pressure to be generated across the end. This differential pressure can subsequently assist the initial biasing system to further urge the sealing ring in the direction of the low pressure, resulting in full or near full conformance of the ring with the surfaces of the elements and zero or near zero leakage.

However, a problem with known seals for rotary couplings is that the bias arrangement constantly urges the sealing ring against one of the elements, resulting in continuous rubbing wear. Any wear can reduce the bias, and therefore reduce the effectiveness of the seal. Further, in sealing rings having a separate spring or elastomeric bias device, rotational slip between the ring and the spring can occur during low pressure operation due to limited frictional interaction between the ring and the spring. This can result in structural failure of the spring, loss of bias and subsequent loss of sealing.

Accordingly a first aspect of the present invention provides a rotary coupling having:

a first element and a coaxial second element, the first and second elements being rotatable relative to each other and defining an annular passage between radially facing walls thereof, a sealing ring at an end of the annular passage, the sealing ring being mounted to the wall of the first element and rotating relative to the second element, and having an active configuration in which the sealing ring is urged against the wall of the second element to seal the end of the annular passage, and a return configuration in which the sealing ring does not seal the end of the annular passage, and a control system for applying a variable load to the sealing ring, wherein the sealing ring moves between the active and return configurations in response to variation in the applied load.

Advantageously, the variation in the applied load allows the degree to which the sealing ring is urged against the wall of the second element in the return configuration to be reduced (indeed, in the return configuration the or each sealing ring may not be urged against the wall of the second element at all), hence wear between the sealing ring and the wall of the second element can also be reduced because the ring can be moved to the active configuration only when required. For example, the control system can cause movement from the return to the active configuration shortly before an increase in differential pressure across the end of the passage.

Likewise, the control system can cause movement from the active to the return configuration shortly after a reduction in or removal of differential pressure across the end of the passage. The coupling allows effective sealing to be maintained to higher differential pressures and greater relative wall velocities. The reliability and life of the coupling can also be improved.

Thus the invention is particularly advantageous in systems where a high pressure state requires sealing of a is rotary coupling for short durations only. Compared to conventional rotary couplings, the wear experienced by the seal may be dramatically reduced because the seal may only be in an active configuration for a small proportion of the total rotational life of the coupling. In contrast, in a conventional rotary coupling, the seal will continuously rub against the walls of the elements even when the passage is not required to be sealed.

The coupling may have any one or any combination of the following optional features.

The rotary coupling may have a second sealing ring at the other end of the annular passage, the second sealing ring also being mounted to the wall of the first element and rotating relative to the second element, and having an active configuration in which the second sealing is urged against the wall of the second element to seal the other end of the annular passage, and a return configuration in which the sealing ring does not seal the other end of the annular passage, the second sealing ring moving between the active and return configurations in response to variation in a load applied to the second sealing ring by the control system. By employing a second sealing ring at the other end of the passage, it is possible to prevent leakage of the fluid from both ends of the passage.

The or each sealing ring may not be urged against the wall of the second element in the return configuration. By ensuring that the ring is urged against the wall of the second element in the active configuration only, wear can be reduced during periods where a tight seal is not required.

Conveniently, the or each sealing ring may be received in a respective groove formed in the wall of the first element.

The or each sealing ring may be biased towards the return configuration, with the variable load acting against the bias. The bias can help to ensure that the ring is urged against the wall only when a sufficient load is applied by the control system, thus reducing wear during periods when a tight seal is not required.

The diameter of the or each sealing ring may change to move the sealing ring between the active and return configurations.

The or each sealing ring may be formed as a coil with one or more windings. The load may be applied tangentially to the ends of the coil to change the diameter of the ring. Preferably, the or each sealing ring has two or more windings.

The first end of the coil may be held in a fixed position relative to the first element and the control system may have an actuator which tangentially translates the second end of the coil to change the diameter of the ring. Holding the first end of the coil in a fixed position can help to anchor the ring in place in the coupling, so that the actuator can always engage with the second end of the coil. The control system may have a sprung return element which acts upon the second end of the coil to provide the bias towards the return configuration.

Typically, the actuator is a hydraulic piston.

The rotary coupling may have a flow path for introducing fluid into the annular passage, the flow path being configured to fluidly communicate with the annular passage only when the or each sealing ring is in the active configuration. By ensuring that fluid can only be introduced to the coupling when the or each sealing ring is in the active configuration, the fluid can be transmitted radially between the elements without leaking from the ends of the passage. Effectively, the ring behaves as a binary switch, switching between the two configurations under the control of the control system.

The flow path may be configured to provide fluid to activate the hydraulic piston. Using the same flow path to provide fluid to activate the piston and to introduce fluid into the annular passage can help to ensure that the or each piston is activated at the same time as there is demand for increased fluid pressure inside the coupling. The increase in fluid pressure can be used to activate the or each piston, and so force the or each sealing ring into an active configuration as the fluid flows into the annular passage.

According to a second aspect of the invention, there is provided a rotor carrying a plurality of circumferentially spaced propeller blades, the rotor having a hydraulic mechanism for changing the pitch of the blades and a rotary coupling according to the first aspect of the invention, the rotary coupling optionally having any one or combination of the optional features described above in relation to the first aspect. The hydraulic mechanism may be in fluid communication with the annular passage of the coupling, whereby the pressure of the fluid in the passage can be transmitted to the hydraulic mechanism to change the blade pitch.

According to a third aspect of the invention, there is provided a double rotary coupling having a first rotary coupling and a second rotary coupling, the first and second rotary couplings both according to the first aspect of the invention, and having any one or combination of the optional features described above in relation to the first aspect. The radially outer of the first and second elements of the first rotary coupling may form the radially inner of the first and second elements of the second rotary coupling.

If one of the first or second couplings in the double rotary coupling has a flow path for introducing fluid into the annular passage of said one of the first and second rotary couplings, the annular passage of the other of the first and second rotary couplings may be in fluid communication with the flow path.

According to a fourth aspect of the present invention, there is provided a pair of coaxial and counter-rotating rotors, each rotor carrying a plurality of circumferentially spaced propeller blades, and each rotor having a respective hydraulic mechanism for changing the pitch of the blades, the rotors having a double rotary coupling according to the third aspect of the present invention, the double rotary coupling having any one or combination of the optional features described above in relation to the third aspect. If the rotary couplings in the double rotary couplings have hydraulic mechanisms, the hydraulic mechanisms may be in fluid communication with respective annular passages of the double rotary coupling, whereby the pressure of the fluid in each passage can be transmitted to the respective hydraulic mechanism to change the corresponding blade pitch.

Any one of the first, second, third and fourth aspects of the present invention may be employed in an engine. Typically, the engine is a gas turbine engine. The engine may be an aeroengine.

Embodiments of the invention will now be described by way of example with reference to the accompanying drawings in which:

FIG. 1 shows a schematic of a prior art rotary coupling;

FIG. 2 shows (a) a return configuration of a sealing ring used in an embodiment of the present invention, (b) an active configuration of a sealing ring used in an embodiment of the present invention, (c) a rotary coupling according to an embodiment of the present invention, in which the sealing ring is in a return configuration, and (d) a rotary coupling according to an embodiment of the present invention, in which the sealing ring is in a active configuration;

Figure 1:
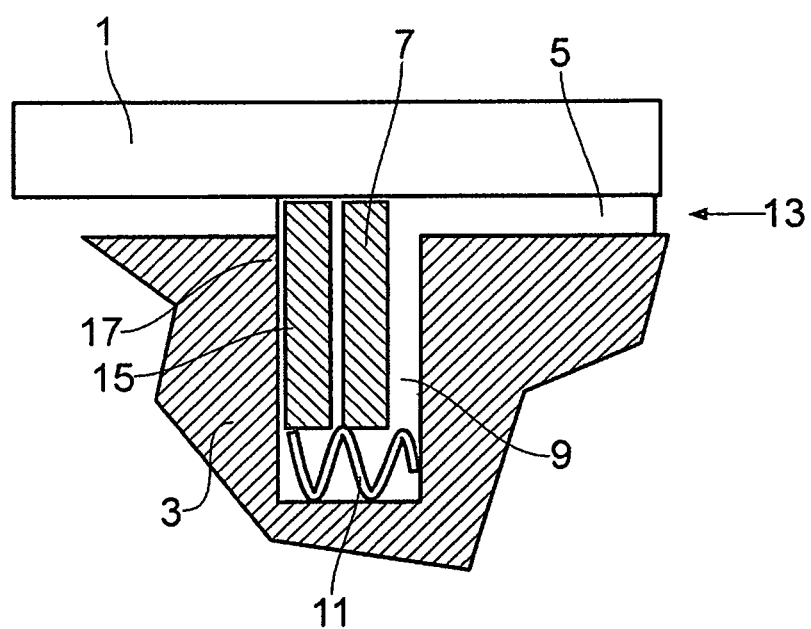

FIG. 1 shows a schematic of a rotary coupling known in the art. The coupling has first 1 and second 3 elements that define a passage 5 between them. A sealing ring 7 is used to seal the passage. The sealing ring is received in a groove 9 in the second element. A spring 11 urges the ring towards the opposing wall of the first element. Fluid is introduced into the passage at one end 13, generating a differential pressure that pushes the sealing ring towards the region of lower pressure. As the sealing ring is translated, a surface 15 of the sealing ring is brought into full or near full conformance with a wall 17 of the groove, thereby sealing the passage and restricting fluid from passing beyond the sealing ring.

Since the spring applies a continuous bias towards the wall of the first element, the sealing ring is exposed to continuous rubbing wear with the first element. Over time, the wear may lead to contact being lost being the sealing ring and the wall of the first element, resulting in leakage of fluid from the passage.

Figure 2:
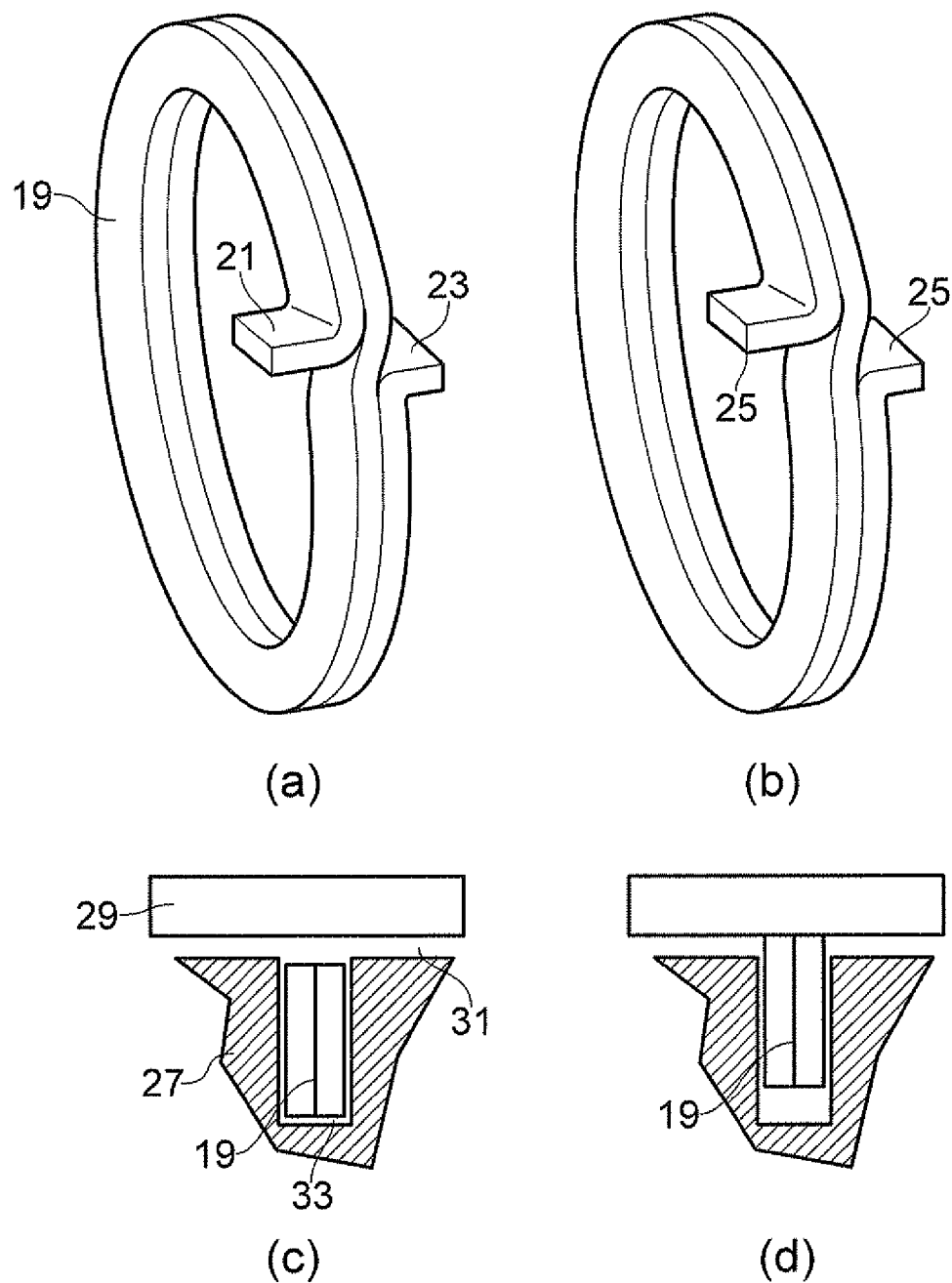

FIGS. 2(a) and 2(b) shows a sealing ring 19 for a rotary coupling according to an embodiment of the present invention. The ring comprises a coil with two windings. The ends of the coil have projections 21, 23 that project out of the plane of their respective windings. In FIG. 2(a), there is no load applied to the ring and the ring is in a return configuration. FIG. 2(b) shows the ring in an active configuration in which a load 25 is applied tangentially to the ring at the projections. The load causes the diameter of the sealing ring to change as the projections are forced in opposite directions.

FIG. 2(c) shows the sealing ring in its return configuration when incorporated in a rotary coupling. The coupling has a first element 27 and a second element 29 that are arranged coaxially and are rotatable relative to each other. The first and second elements define an annular passage 31 between their radially facing walls. The ring is contained within a groove 33 in the first element at the end of the passage. When the ring is in the return configuration, the annular passage remains unsealed, allowing fluid to flow there-through. FIG. 2(d) shows the rotary coupling in an active configuration. The load 25 applied to the ends of the ring causes the ring diameter to expand, urging it against the opposing wall of the second element. In so doing, the ring seals the annular passage, restricting the flow of fluid through the passage. Once touching the opposing wall, the load can continue to be increased to ensure a strong seal is maintained. Differential pressure across the ring at the end of the passage can also push the sealing ring towards the region of lower pressure bringing a side surface of the ring into full or near full conformance with a wall of the groove.

Figure 3:
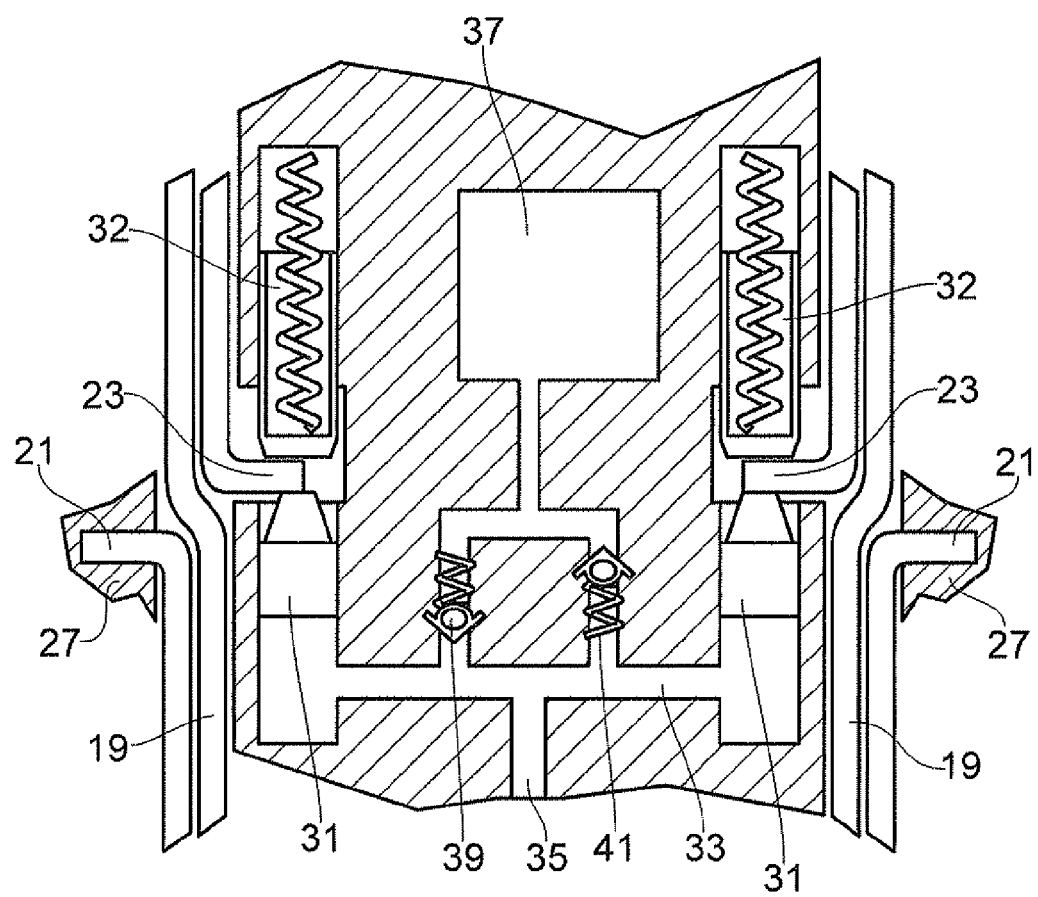
FIG. 3 shows a schematic of a control system for a rotary coupling according to an embodiment of the present invention.

FIG. 3 shows a schematic of a control system for a rotary coupling according to an embodiment of the present invention. In this embodiment, the rotary coupling has two sealing rings 19 that are comprised of coils, mounted at either end of the annular passage. Each coil has a projection 21 at one end that is held fixed inside a recess in the first element 27. The other end of each coil has a projection 23 that engages with a respective hydraulic piston 31. When actuated, each hydraulic piston applies a tangential load to the end of the respective coil. The load translates the end of the coil relative to the end fixed inside the first element, thereby changing the diameter of the ring.

The pistons comprise part of a hydraulic circuit 33 that can vary the size of a load applied to the sealing rings. The hydraulic circuit has an inlet 35 through which fluid is allowed to enter and an outlet 37 which channels the fluid to the annular passage between the first and second elements of the coupling. The circuit includes a medium pressure check valve 39 and a low pressure check valve 41 that together control the flow of fluid between the inlet and outlet of the circuit. The medium pressure check valve resists the flow of fluid from the inlet to the outlet until a set pressure value has been reached. As fluid enters the circuit from the inlet, the pressure rises, actuating the hydraulic pistons and forcing the sealing rings into the active configuration. Once the pressure in the circuit is sufficient to ensure that the sealing rings are in the active configuration, fluid is allowed to flow through the medium pressure check valve towards the outlet and into the annular passage. Thus, the medium pressure valve ensures fluid does not enter the annular passage until the sealing rings are in the active configuration and the passage is sealed. The low pressure check valve meanwhile ensures that fluid cannot return from the outlet towards the inlet until the pressure at the inlet has receded beyond the fluid pressure at the outlet.

In addition to the hydraulic piston, each sealing ring engages with a respective spring element 32 that pushes against the ring in the opposite direction to the hydraulic piston. The spring element provides a restoring force that acts against the load applied by the hydraulic piston, forcing the ring towards the return configuration as the load from the hydraulic piston is removed. The restoring force is set so that the rings only move to the return configuration when the low pressure check valve 41 is open, i.e. when the fluid pressure in the annular passage is relieved.

Figure 4:
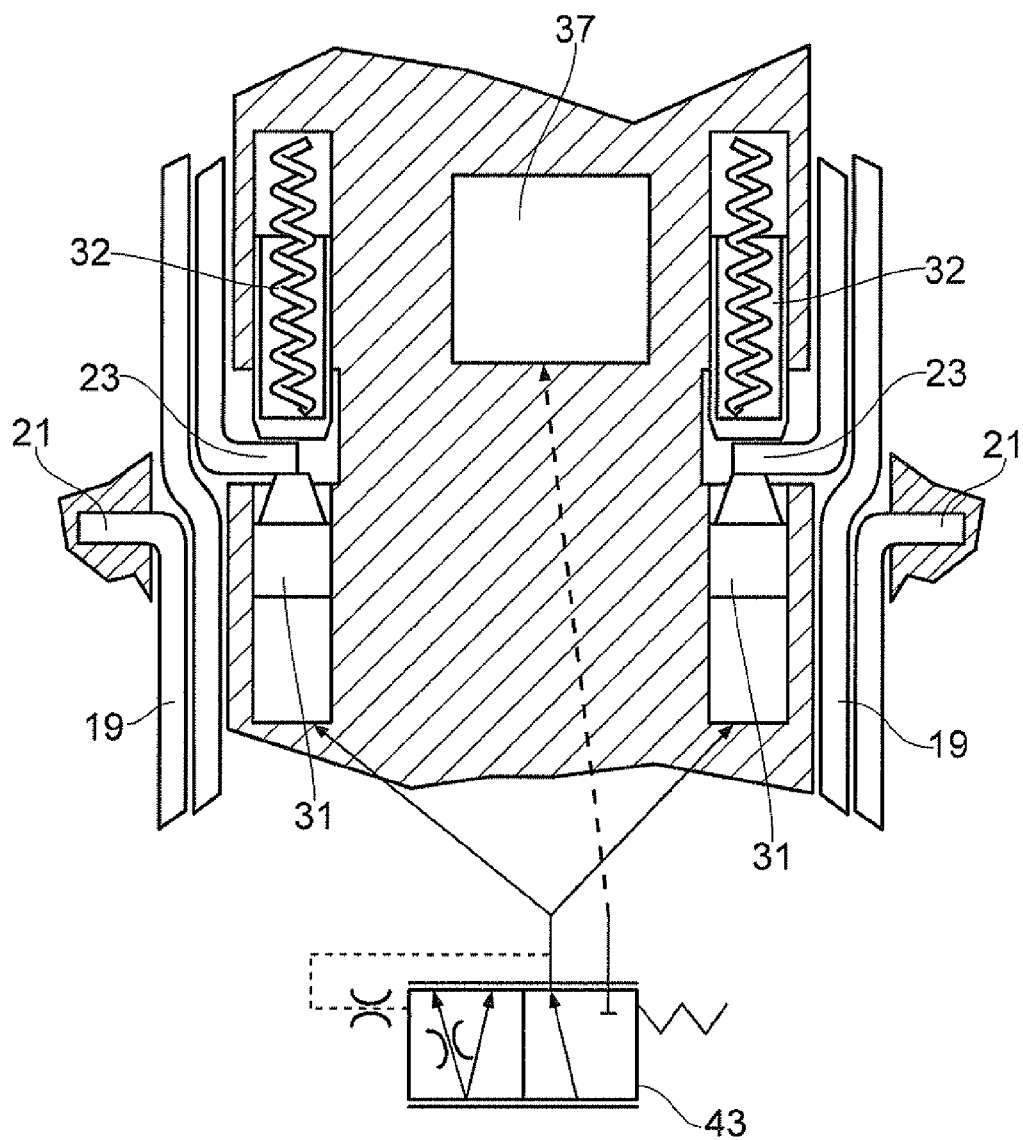
FIG. 4 shows a schematic of a control system for a rotary coupling according to another embodiment of the present invention.

FIG. 4 shows a schematic of a control system for a rotary coupling according to another embodiment of the present invention. Features which are common to the previous embodiment have the same reference numbers in FIGS. 3 and 4. In the embodiment shown in FIG. 4, the medium pressure check valve and low pressure check valve are replaced by a priority spool valve 43. As fluid enters the hydraulic circuit, the priority spool valve ports the increasing supply pressure to the hydraulic pistons. When the pressure ported to the spool end of the valve is sufficient to overcome the spool positioning spring force, the spool allows the fluid to flow towards the outlet and into the annular passage. The spool positioning spring is calibrated so that the spring force will only be overcome once the sealing rings are in the active configuration. Likewise, when the supply pressure is decreased, the spool valve allows the fluid to return from the annular passage before the restoring force of the spring elements 32 move the sealing rings to the return configuration.

Figure 5:
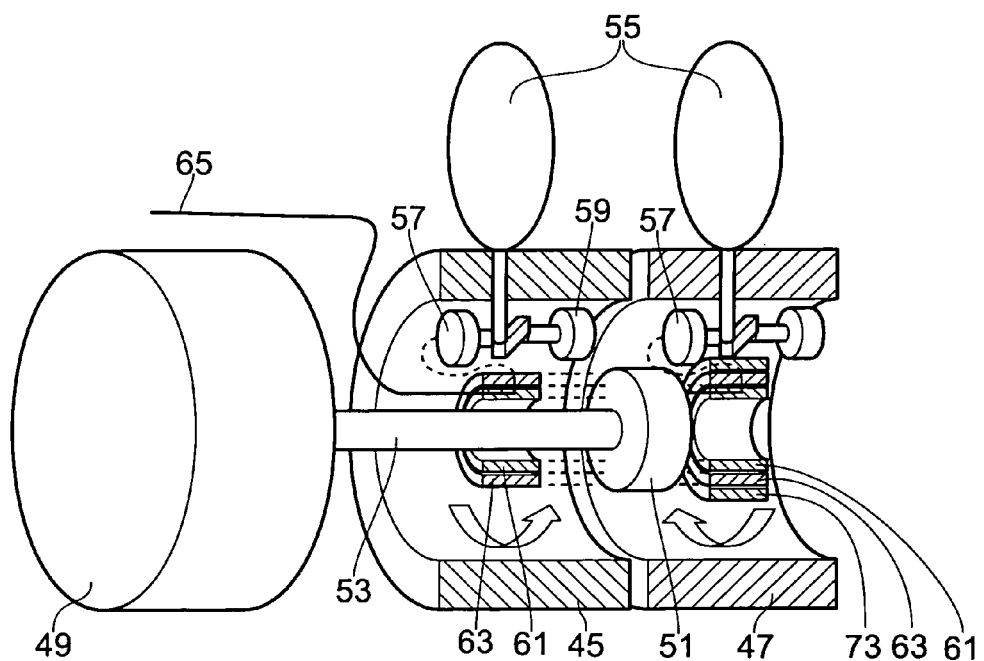
FIG. 5 shows a schematic of a contra-rotating propeller engine having a rotary coupling according to the present invention.

FIG. 5 shows a contra-rotating propeller engine having a rotary coupling according to the present invention. The engine comprises forward 45 and aft 47 rotors that rotate in opposite directions to one another. The rotors are driven to rotate by a gas generator power supply 49 that drives a gearbox 51 via a drive shaft 53. Each rotor carries a plurality of circumferentially spaced propeller blades 55. The pitch of the propeller blades on each rotor is controlled by a hydraulic mechanism that comprises a primary actuation system 57 and a re-feathering system 59, the re-feathering system being provided for safety back-up should the primary actuation system fail.

The hydraulic mechanisms are configured to rotate with the rotor. When the rotors are in motion, fluid pressure can be transmitted to the hydraulic mechanisms in order to change the corresponding blade pitch. Typically, 500-3000 psi (3.5-21 MPa) actuation pressure is required to actuate the re-feathering system. The fluid pressure is transmitted to the hydraulic mechanisms of the forward and aft rotors through respective rotary couplings. The disposition of the hydraulic mechanisms requires that the couplings have medium to large diameters, since these must fit around the drive shaft of the engine. The large diameter of the couplings in turn results in a high peripheral velocity, which, coupled with the pressure required for actuation of the hydraulic mechanism, places stringent demands on the operating capabilities of the rotary couplings. Conventional rotary couplings have only shown successful operation in circumstances where the product of pressure and velocity is approximately half of that required in the present application.

The rotary coupling for the forward rotor comprises a static internal tube 61 that is coaxial with the drive shaft of the engine. Surrounding the static internal tube is an outer tube 63 that rotates at the speed of the forward rotor. The static inner tube and the outer tube form the first and second elements of the rotary coupling. Fluid is introduced into the internal tube of the forward rotor coupling via an input feed 65, and transmitted via the coupling to the hydraulic mechanism in order to change the pitch of the propeller blades.

In order to actuate the hydraulic mechanism for the aft rotor, two rotary couplings are required. The first of the two rotary couplings is that of the forward rotor. The second of the two rotary couplings is coaxial with the first rotary coupling, and comprises the radially outer tube of the forward rotor rotary coupling as the first element of the second coupling. A further tube 73 then surrounds the outer tube 63 of the forward rotor rotary coupling to form the second element of the second coupling. The outer tube 73 of the second rotary coupling rotates with the same velocity as the aft rotor. When the forward and aft rotors are rotating at the same speed, the velocity of the outer tube 73 of the second rotary coupling relative to the inner tube of the second rotary coupling (i.e. tube 63) is twice that of the outer tube 63 of the first rotary coupling relative to the inner tube 61 of the first rotary coupling, owing to the contra-rotation of the forward and aft rotors. Thus the sealing requirements of the second rotary coupling are more arduous than that of the first rotary coupling. It will be appreciated that the dashed lines in FIG. 5 indicate that the inner and outer tubes 61, 63 of the first outer coupling could extend axially between the forward and aft rotors.

The hydraulic mechanism of the aft rotor is in fluid communication with the annular passage of the second rotary coupling. When fluid is introduced into the annular passage of the second rotary coupling, the pressure of the fluid in the annular passage can be transmitted to the hydraulic mechanism of the aft rotor in order to change the corresponding blade pitch. The annular passage of the second rotary coupling is also in fluid communication with the annular passage of the first rotary coupling, thus allowing fluid to be introduced into both couplings from the same input feed.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are incorporated by reference.

The invention claimed is:

1. A rotary coupling comprising:
   a first element and a coaxial second element, the first and second elements being rotatable relative to each other and defining an annular passage between radially facing walls thereof,
   a sealing ring at an end of the annular passage, the sealing ring being mounted to the wall of the first element and rotating relative to the second element, the sealing ring having (1) an active configuration in which the sealing ring is urged against the wall of the second element to seal the end of the annular passage, and (2) a return configuration in which the sealing ring does not seal the end of the annular passage, both the first element and the sealing ring being rotatable relative to the second element when the sealing ring is in both the active configuration and the return configuration, and
   a control system for applying a variable load to the sealing ring, wherein
   the sealing ring moves between the active and return configurations in response to variation in the applied load.

2. The rotary coupling according to claim 1, further comprising:
   a second sealing ring at an other end of the annular passage, the second sealing ring being mounted to the wall of the first element and rotating relative to the second element, and having (1) an active configuration in which the second sealing ring is urged against the wall of the second element to seal the other end of the annular passage, and (2) a return configuration in which the second sealing ring does not seal the other end of the annular passage, the second sealing ring moving between the active and return configurations in response to variation in a load applied to the second sealing ring by the control system.

3. The rotary coupling according to claim 1, wherein in the return configuration, each sealing ring is not urged against the wall of the second element.

4. The rotary coupling according to claim 1, wherein each sealing ring is biased towards the return configuration, the variable load acting against the bias.

5. The rotary coupling according to claim 1, wherein a diameter of each sealing ring changes to move the sealing ring between the active and return configurations.

6. The rotary coupling according to claim 5, wherein each sealing ring is formed as a coil with one or more windings, the load being applied tangentially to ends of the coil to change the diameter of the sealing ring.

7. The rotary coupling according to claim 6, wherein a first end of the coil is held in a fixed position relative to the first element and
   the control system has an actuator which tangentially translates a second end of the coil to change the diameter of the sealing ring.

8. The rotary coupling according to claim 7 wherein each sealing ring is biased towards the return configuration,
   the variable load acting against the bias and
   the control system has a sprung return element which acts upon the second end of the coil to provide the bias towards the return configuration.

9. The rotary coupling according to claim 7, wherein the actuator is a hydraulic piston.

10. The rotary coupling according to claim 1, further comprising:
    a flow path for introducing fluid into the annular passage, the flow path being configured to fluidly communicate with the annular passage only when each sealing ring is in the active configuration.

11. The rotary coupling according to claim 10 wherein the control system includes an actuator in the form of a hydraulic piston and
    the flow path is configured to provide fluid to activate the hydraulic piston.

12. A rotor having a plurality of circumferentially spaced propeller blades carried thereon, the rotor comprising:
    a hydraulic mechanism for changing a pitch of the plurality of circumferentially spaced propeller blades,
    a rotary coupling according to claim 10, and
    the hydraulic mechanism being in fluid communication with the annular passage of a coupling, wherein
    a pressure of the fluid in the annular passage can be transmitted to the hydraulic mechanism to change the blade pitch.

13. A double rotary coupling comprising:
    a first rotary coupling and a second rotary coupling according to claim 1, wherein
    a radially outer one of the first and second elements of the first rotary coupling forms a radially inner one of the first and second elements of the second rotary coupling.

14. The double rotary coupling according to claim 13, wherein
    the annular passage of one of the first and second rotary couplings is in fluid communication with a flow path for introducing fluid into the annular passage of an other of the first and second rotary couplings.

15. A pair of coaxial and counter-rotating rotors, each rotor comprising:
    a plurality of circumferentially spaced propeller blades;
    a respective hydraulic mechanism for changing a pitch of the plurality of circumferentially spaced propeller blades,
    the rotors including a double rotary coupling according to claim 14,
    a hydraulic mechanisms being in fluid communication with respective annular passages of the double rotary coupling, wherein
    a pressure of the fluid in each annular passage can be transmitted to the respective hydraulic mechanism to change the corresponding blade pitch.

* * * * *